United States Patent
Chin

(10) Patent No.: US 6,400,856 B1
(45) Date of Patent: Jun. 4, 2002

(54) POLARIZATION DIVERSITY DOUBLE RESONATOR CHANNEL-DROPPING FILTER

(75) Inventor: Mee Koy Chin, Wilmette, IL (US)

(73) Assignee: Nannovation Technologies, Inc., Miami, FL (US)

(*) Notice: Subject to any disclaimer, the term of this patent is extended or adjusted under 35 U.S.C. 154(b) by 0 days.

(21) Appl. No.: 09/666,178

(22) Filed: Sep. 21, 2000

Related U.S. Application Data

(60) Provisional application No. 60/155,286, filed on Sep. 21, 1999.

(51) Int. Cl.$^7$ .................................................. G02B 6/27
(52) U.S. Cl. ............................................. 385/11; 385/4
(58) Field of Search .............................. 385/1–4, 8–10, 385/11, 24, 31, 32, 35; 359/127, 132, 483, 484

(56) References Cited

U.S. PATENT DOCUMENTS 4,390,236 A * 6/1983 Alferness ........................ 385/9
5,002,349 A * 3/1991 Cheung et al. ................. 385/1
5,502,783 A * 3/1996 Wu .............................. 385/42
6,233,372 B1 * 5/2001 Nakaya ......................... 385/11

OTHER PUBLICATIONS

Tian et al., "Polarization–Independent Integrated Optical, Acoustically Tunable Double–Stage Wavelength Filter in LiNbO3", Journal of Lightwave Technology, vol. 12, No. 7, Jul. 1994.*

* cited by examiner

*Primary Examiner*—Akm E. Ullah
*Assistant Examiner*—Michelle R. Connelly-Cushwa
(74) *Attorney, Agent, or Firm*—Stroock & Stroock & Lavan LLP

(57) ABSTRACT

A polarization diversity scheme for managing the polarization dependence of a micro-ring resonator which employs two resonators serially arranged and constructed to separately filter transverse electric (TE) and transverse magnetic (TM) polarization components of a predetermined wavelength in a randomly polarized DWDM optical signal, and to recombine the separately filtered components prior to output from an optical component employing the inventive polarization diversity scheme.

20 Claims, 3 Drawing Sheets

POLARIZATION DIVERSITY DOUBLE RESONATOR CHANNEL-DROPPING FILTER

CROSS-REFERENCE TO RELATED APPLICATION

This application claims priority to Provisional Patent Application Ser. No. 60/155,286, filed on Sep. 21, 1999.

FIELD OF THE INVENTION

The present invention is directed to polarization independent optical filters.

BACKGROUND OF THE INVENTION

Optical signal transmission encounters problems similar to those found in electrical networks, and also encounters problems unique to optical networks. For example, both electrical and optical networks must handle ever-increasing amounts of data (e.g., voice, video, audio, text, graphics, etc.). For optical networks, various multiplexing schemes are employed (e.g., wave division multiplexing (WDM), dense WDM, and ultra-dense WDM) to increase transmission bandwidth by simultaneously transmitting data from a plurality of sources to a plurality of destinations over a single optical medium such as, for example, a fiber-optic cable or waveguide. Obviously, the data from the plurality of sources is not intended for the same destination and it is necessary to selectively switch and route the various data to its intended destination using filters, switches, couplers, routers, etc.

An optical signal typically comprises a plurality of wavelengths, with each wavelength representing data from a different source. An optical network must be able to direct each wavelength (i.e., each separate data source), separate from the other wavelengths, over various paths in the network. Switching/filtering not only facilitates routing of a desired wavelength to its intended destination, it also facilitates re-routing in the case of network failure (e.g., fiber-optical cable breakage), or to alleviate network congestion, as two examples. As the need for bandwidth continues to increase (whether for optical or electrical networks), so too does the need to distinguish the various signals being simultaneously transmitted.

Unique to optical transmission are the polarization modes of an optical signal. A single optical signal may have both transverse electric (TE) and transverse magnetic (TM) modes, each propagating through the optical components of the network at different speeds and generally experiencing slightly different conditions. A WDM signal, for example, is randomly polarized, with each wavelength having a different, independent polarization. Optical fiber, for example, has a small birefringence such that, after propagating through any substantial length of fiber, the optical signal arriving at the end of the fiber will have a random, unpredictable polarization different from that at the input end of the fiber. Thus, any subsequent optical component into which the optical signal is coupled must not differentiate between the different polarizations if the optical network is to be transparent to polarization. It is thus desirable to provide an optical system, component, and/or device that is essentially polarization independent and that enables transmission of a randomly polarized multi-wavelength optical signal.

It is desirable that optical networks (and the systems and components that make up the networks) be capable of handling both polarization modes.

It is thus desirable to provide an optical a system, component, and/or device that is essentially polarization independent and that enables transmission of a polarized multi-wavelength optical signal.

SUMMARY OF THE INVENTION

The present invention is directed to a polarization independent, channel-dropping optical filter comprised of two complementary filtering elements: one tuned for TE polarization mode and the other for TM polarization mode. The filtering elements are preferably tuned to the same predetermined wavelength so that a specific wavelength may be separated (i.e., filtered) from a randomly polarized wavelength division multiplexed (WDM) optical signal. The filtering elements also preferably have the same peak transmission characteristics. The present invention also advantageously filters both polarization modes of the desired wavelength. The filter further comprises input and output waveguides which strongly confine and guide a polarized multi-wavelength optical signal. Each waveguide is separated from the filtering elements by a gap over which the optical signal may be coupled to and from the filtering elements.

The filtering elements preferably comprise a micro-ring or circular disk resonator, or a non-circular micro-ring resonator with substantially straight sections that define a coupler length that facilitates light transfer between the waveguides and resonators. The resonators of the inventive filter preferably satisfy the following requirements: one resonator couples only TE polarization mode and the other couples only TM polarization mode; the resonators are tuned to the same resonance wavelengths for both TE and TM polarization modes; and the resonators have the same transfer characteristics for both TE and TM polarization modes.

The resonators are preferably photonic-well or photonic-wire waveguides that strongly confine (e.g., a the planar direction) and guide light. The strong confinement characteristics make it possible to construct resonators having relatively small bend radii (e.g., on the order of approximately 10 microns).

The evanescent coupling between the straight waveguides and the resonator is dependent on the gap size, the waveguide width, and the material indices inside and outside the waveguides. For better control of the coupling, a racetrack shaped resonator may be used, i.e., one with substantially straight coupling sections having a pre-determined length and that are disposed in substantially parallel relation with the input and output waveguides. With proper choice of the gap size and waveguide width, for example, it is possible to design the resonator to be favorable for either TE or TM modes. The exact coupling factor will then be determined by the length of the straight coupling section.

Preferably, the filter is constructed having the following parameters: a gap is defined between the input waveguide and resonators, and between the resonators and output waveguide that has a width which is less than 0.5 $\mu$m; the width of the waveguides (including the waveguides of the resonators) is less than 1 $\mu$m; the coupler length is less than 50 $\mu$m; and the ratio of the index of refraction inside the waveguides to the index of refraction of the medium (e.g. air) in the gap between the waveguides is greater than 1.5.

The operation of the filter is affected by the polarization of the light signal. For TE mode signals, it is preferred that the width of the waveguides be less than 0.25 $\mu$m. As for TM mode signals, it is preferred that the width of the waveguides be greater than 0.35 $\mu$m.

The relationship between the waveguide width and gap width and their effect on polarization is discussed in detail in co-pending patent application Ser. No. 09/574,835 entitled Nanophotonic Directional Coupler Device, the entire content and disclosure of which is hereby incorporated by reference.

It is preferred that symmetry be achieved in the filter design and construction. Specifically, the waveguides are similarly or substantially similarly formed (e.g., materials, dimensioning, etc.) to enable efficient transfer of the light signal between the input/output waveguides and the resonators.

Thus, the present invention is directed to a novel optical filter comprised of polarization dependent components to provide a polarization independent device.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views.

DETAILED DESCRIPTION OF THE PRESENTLY PREFERRED EMBODIMENTS

The present invention is directed to a polarization independent channel-dropping optical filter comprised of two complementary filtering elements; one tuned to TE polarization and the other to TM polarization. The filtering elements are also preferably tuned to the same predetermined wavelength so that both polarization modes of a specific wavelength may be separated (i.e., filtered) from a randomly polarized wavelength division multiplexed (WDM) optical signal. The filter further comprises input and output waveguides which strongly confine and guide a polarized multi-wavelength optical signal. Each waveguide is separated from the filtering elements by a gap over which the optical signal may be coupled to and from the filtering elements.

Figure 1:
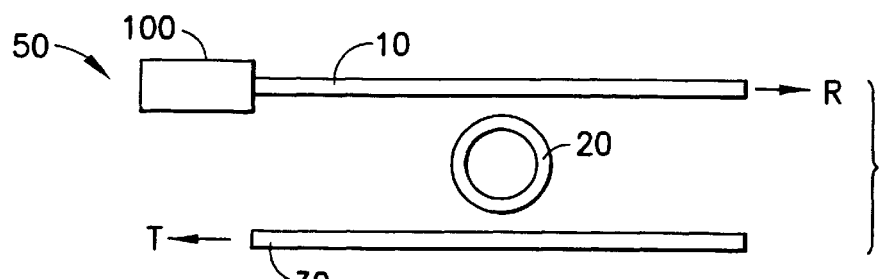
FIG. 1 is a schematic view of a prior art channel-dropping filter having input and output waveguides coupled to a single micro-ring resonator.

Referring first to FIG. 1, the general operation of a channel-dropping filter, designated generally as 50, will now be discussed. Channel-dropping filters include a resonator 20 tuned or tunable to a particular wavelength. When a multi-wavelength optical signal such as, for example, a wave-division multiplexed (WDM) signal, propagates in (i.e., is guided by) the input waveguide 10, a portion of that signal (in terms of optical power but including all wavelengths of the signal) is coupled from waveguide 10 into the resonator 20. The wavelength of the coupled signal that is on-resonance with the wavelength to which the resonator 20 is tuned constructively interferes within the resonator 20, while off-resonance wavelengths destructively interfere and eventually attenuate. An optical signal having only the on-resonance wavelength is coupled from the resonator 20 to the output waveguide 30, and exits the filter 50 as a transmission signal T. A residual part (i.e., that part not coupled from the input waveguide 10 to the resonator 20) of the optical signal from the optical source 100 exits the filter from the input waveguide 10 as a reflection signal R. The resonator 20 may be fixedly tuned to a particular wavelength by virtue of its design and construction. Alternatively, the resonator 20 may be selectively tuned by application of an electrical signal or field and due to the electro-optic effect, which refers to a change in the refractive index of a material under the influence of an electrical signal or field.

The filter 50 depicted in FIG. 1 is polarization dependent and can only effectively transmit one of the two polarization modes. Thus, light may be transmitted for one polarization mode, yet attenuated for the other polarization mode. This is clearly undesirable for optical communications where an optical signal may shift between polarization mode as the signal propagates through the waveguide (or optical fiber, as the case may be).

The present invention provides a novel solution to address polarization in an optical signal that overcomes the shortcomings of the prior art. Optical communication systems and components may now be constructed that are polarization independent by utilizing complementary polarization dependent components (one tuned to each polarization mode). Unless otherwise stated, the input waveguide, resonators (actually constructed as a continuous waveguide having generally parallel straight sections (coupler lengths) joined by longitudinally disposed arcuate sections), and output waveguide are similarly, if not identically, constructed. Thus, discussion of the construction, material, dimensions, operation, etc., of one waveguide shall apply to the other waveguides, unless the contrary is stated. Similarly, discussion of the operation of the input waveguide 60 (see, e.g., FIG. 2) shall apply to the output waveguide 90, unless stated otherwise.

Figure 2:
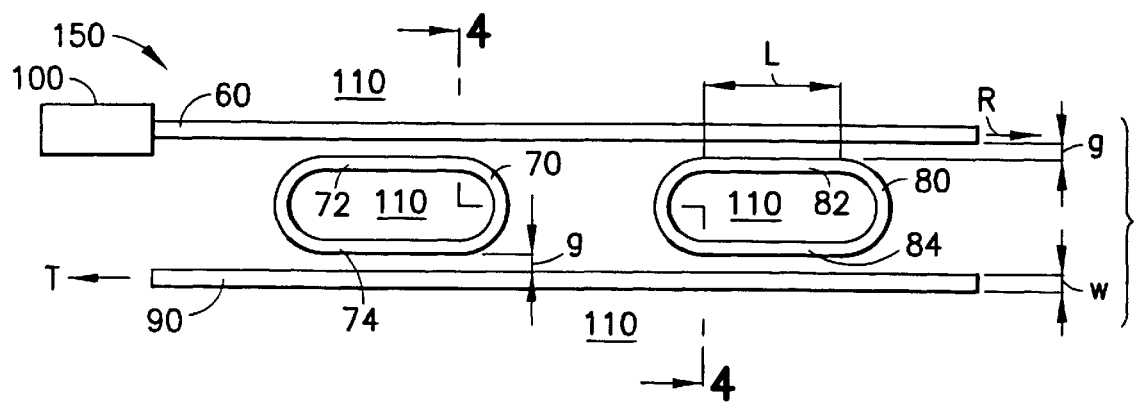
FIG. 2 is a schematic view of a polarization independent channel-dropping filter having two wavelength and polarization-tuned micro-ring resonators and constructed in accordance with the present invention.
Figure 4:
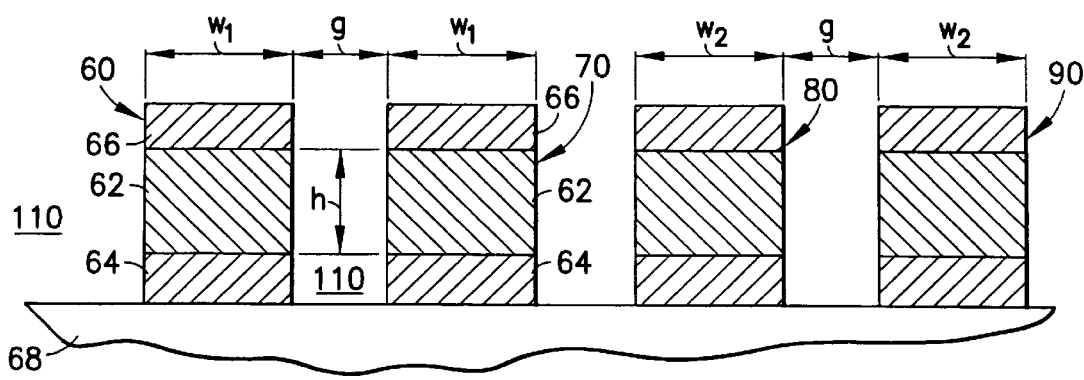
FIG. 4 is a cross-sectional view taken along the line 4—4 of FIG. 2.

Referring next to FIG. 2, a polarization independent channel-dropping filter 150 constructed in accordance with an embodiment of the present invention is there depicted. An optical source 100, which may be a laser, fiber-optic cable, waveguide, or other light generating or propagating device, provides a multi-wavelength optical signal input (e.g., WDM, DWDM, UDWM signal, or the like) to the input waveguide 60. The input waveguide 60 may be either a photonic-well or a photonic-wire construction, such as those disclosed in U.S. Pat. Nos. 5,790,583 and 5,878,070, respectively, the entire contents and disclosures of which are hereby incorporated in their respective entireties. A cross-section of the waveguides and resonators are is depicted in FIG. 4 and discussed in more detail below.

The primary difference between the photonic-well and photonic-wire construction is the refractive index of the semiconductor material above and below the core 62 (see, e.g., FIG. 4). In a photonic-well construction, the core 62 is surrounded by upper and lower cladding layers 66, 64 of relatively low (with respect to the refractive index of the core material) refractive index material; the lower cladding layer 64 being disposed on a substrate 68. In a photonic-wire construction, the core 62 is surrounded by upper and lower cladding layers 66, 64 of relatively low refractive index material. Both constructions have relatively low refractive index material 110 laterally surrounding the waveguide 60 and disposed in the gap g between the waveguides 60, 90 and resonators 70, 80. The construction of the output waveguide 90 and resonators 70, 80 (170 and 180 in FIG. 3) are substantially, if not identically, the same as just described.

The index of refraction inside the waveguide $n_{wg}$ refers to the index of refraction of the core 62 material. The core 62 may be formed from Gallium Arsenide or Indium Phosphide; both these materials have an index of refraction that is approximately 3.5. For a photonic-well construction, the upper and lower cladding layers 66, 64 are preferably constructed of a material having a relatively high refractive index, when compared with the refractive index of the core 62. Thus, strong photon confinement is provided only laterally of the waveguide by the relatively low refractive index material 110 provided in the gap g and otherwise around the waveguide (see, e.g., FIG. 2). For a photonic-wire construction, the upper and lower cladding layers 66, 64 are preferably constructed of a material having a relatively low refractive index, when compared with the refractive index of the core 62. Thus, strong photon confinement is provided on all sides of the waveguide. Additionally, the index of refraction $n_g$ refers to the index of refraction of a medium that is disposed in the gap g. Most typically, the medium will be air, having an index of refraction of 1.0. However, other insulative mediums can be used.

With continued reference to FIG. 2, first and second resonators 70, 80 may be constructed as either photonic-well or photonic-wire waveguides. Since the resonators 70, 80 are nearly identical (different waveguide and gap widths providing either TE or TM coupling), the following discussion is directed to the first resonator 70, it being understood that such discussion applies equally to the second resonator 80, with the exception of the different dimensions for the waveguide and gap width. The resonator 70 includes substantially straight input and output sections 72, 74 which respectively define a substantially constant gap g between the input waveguide 60 and output waveguide 90, and the resonator 70. As s result, input and output sections 72, 74 thus define a coupler length L, which is the length of optical path along which coupling occurs (from the input waveguide to the resonator, and to the output waveguide).

The filter 50 is preferably formed within the following dimensional parameters (see, e.g., FIG. 4): a gap g between the resonator 70 and each of the input waveguide 60 and the output waveguide 90 of less than approximately 0.5 μm; a waveguide width w for each of the input, output, and resonators of less than approximately 1 μm; a coupler length L of less than approximately 50 μm; and, a ratio of the index of refraction of the core 62 to the index of refraction of a medium 110 surrounding the waveguide (i.e., in the gaps) which is preferably greater than 1.5. Preferably, one resonator has a waveguide width $w_1$ of less than 0.25 μm for TE mode coupling, and the other resonator has a waveguide width $w_2$ of greater than 0.35 μm for TM mode coupling, as depicted in FIG. 4. The width of the waveguide 60 will correspondingly generally to the width of the resonator 70, 80. Thus, where a resonator width $w_1$ (see, e.g., FIG. 4) is less than 0.25 μm, the waveguide width will be approximately the same. Likewise, where the resonator width is greater than 0.35 μm the waveguide width will be approximately the same. The width of the input waveguide 60 thus tapers from less than approximately 0.25 μm to greater than approximately 0.35 μm, at least in between the resonators 70, 80.

It is also preferred that symmetry be achieved in the filter 50 design and construction. Specifically, the waveguides 60, 90, and the resonators 70, 80 are similarly or substantially similarly formed (e.g., materials, dimensioning, etc., and with the exception of the resonator width) to enable efficient transfer of the light signal (also referred to herein as an optical signal).

As with all optical devices, operation of the channel-dropping filter 50 of the present invention is affected by the polarization of the light signal propagating within (through) the various waveguides of the device. For transverse electric (TE) mode signals, it is preferred that the width $w_1$ (see, e.g., FIG. 4) of one resonator waveguide be less than 0.25 μm. As for transverse magnetic (TM) mode signals, it is preferred that the width $w_2$ of one resonator waveguide be greater than 0.35 μm. If a filter 50 is designed to accommodate a light signal of a certain polarization, it may not operate efficiently with a signal of a different polarization. For example, if a filter is designed specifically to accommodate a TE mode light signal (i.e., constructed with waveguides less than 0.25 μm wide), a TM mode signal will pass through the filter 50 with little or no transfer of signal between the input waveguide 60 and resonator.

By using two differently constructed resonators 70, 80, the present invention eliminates any concern for the polarization of the light signal, and provides efficient signal transfer from the input waveguide 60 to the output waveguide 90, via the resonators 70, 80, regardless of the polarization of the optical signal and further regardless of whether the optical signal contains both TE and TM polarization modes. The present invention thus provides a polarization independent channel-dropping filter by using pairs of polarized resonators.

The above-described dimensions of the waveguides may be calculated using the following formulas.

GAP WIDTH (g)

It is preferred that the gap width g between the input waveguide 60, and straight section 72, 82 (and between output waveguide 90 and straight sections 74, 84) of the resonators 70, 80 be less than 0.5 μm, and may be calculated as follows:

$$g < \frac{\lambda}{\sqrt{n_{wg}^2 - n_g^2}} \quad (1)$$

where, λ is the wavelength of the light signal in free space, $n_{wg}$ is the index of refraction inside the waveguide; and $n_g$ is the index of refraction in the gap.

WAVEGUIDE WIDTH (w)

The waveguides each have a width w that is preferably less than 1 μm, and may be calculated using the following equation:

$$w < \lambda/n_{wg} \quad (2)$$

For TE mode signals, the waveguide width is preferably less than 0.25 μm, and for TM mode signals, greater than 0.35 μm. Additionally, if the waveguides are photonic-wire construction, then the height h of the core 62 (see, e.g., FIG. 4)) is also preferably made equal between the input waveguide 60 and input straight sections 72, 82, and between the output waveguide 90 and output straight sections 74, 84. It is also preferred that for photonic-wire waveguides, the width w be equal to the height h.

COUPLER LENGTH (L)

As discussed above, the straight sections 72, 82 and 74, 84 of the resonators 70, 80 define a respective coupler length L that are preferably equal to each other. In a preferred embodiment, the coupler length L is less than 50 μm.

The coupling factor is dependent on several factors including the gap widths, the coupler lengths, the waveguide widths, the indices of refraction, the polarization of the light being transferred, and the wavelength of the light. With the subject invention, the gap widths can be made larger than that disclosed in the prior art resonators, with longer coupler lengths being used to achieve the same coupling factor as with a circular resonator, for example. The increase in gap widths causes a drop in coupling factor, wherein, an increase in coupler length causes an increase in coupling factor. With the subject invention, by increasing the coupler length, an increase in coupling factor is achieved that is at least commensurate with the drop in the coupling factor caused by the increase in the gap width. The net effect is to produce a resonator that is easier to manufacture, because of the more generous gap width than that in the prior art, without any sacrifice in performance. Additionally, the coupler lengths can be easily changed since the length of the straight sections may be increased as needed to achieve the desired coupling factor. However, such an increase would require a corresponding change in the dimensions (i.e., radius) of the arcuate sections so as to preserve the round-trip optical path length. In this manner, resonators with generally the same overall width (as measured between the straight portions) can operate with different coupling factors. In contrast, prior art resonators, including circular and elliptical resonators, require changes in curvature, gap widths, etc., to achieve changes in coupling factor—which is difficult to realize.

As discussed above, light signals have either a TM polarization or a TE polarization. As a result, signals of different polarizations behave differently and have different transfer characteristics within a waveguide. For example, the effective indices of refraction $N_s$ and $N_A$ are respectively generally different for TE and TM signals. To take polarization into consideration, a TM specific waveguide is preferably designed with the additional limitation that the waveguide width w is greater than 0.35 μm. In contrast, a TE specific waveguide is preferably designed with the additional limitation that the waveguide width w is less than 0.25 μm. It should be noted that a light signal with a TM polarization will not transfer in a TE specific waveguide, whereas, a light signal with a TE polarization may partially transfer in a TM specific waveguide. In either case, there is very inefficient or no transfer of signal. Furthermore, the TM specific waveguide generally has larger coupler lengths that TE specific waveguide. This means that in order to design a waveguide that favors a particular polarization, the waveguide must satisfy a certain combination of waveguide width, gap size and coupler length simultaneously.

Figure 5:
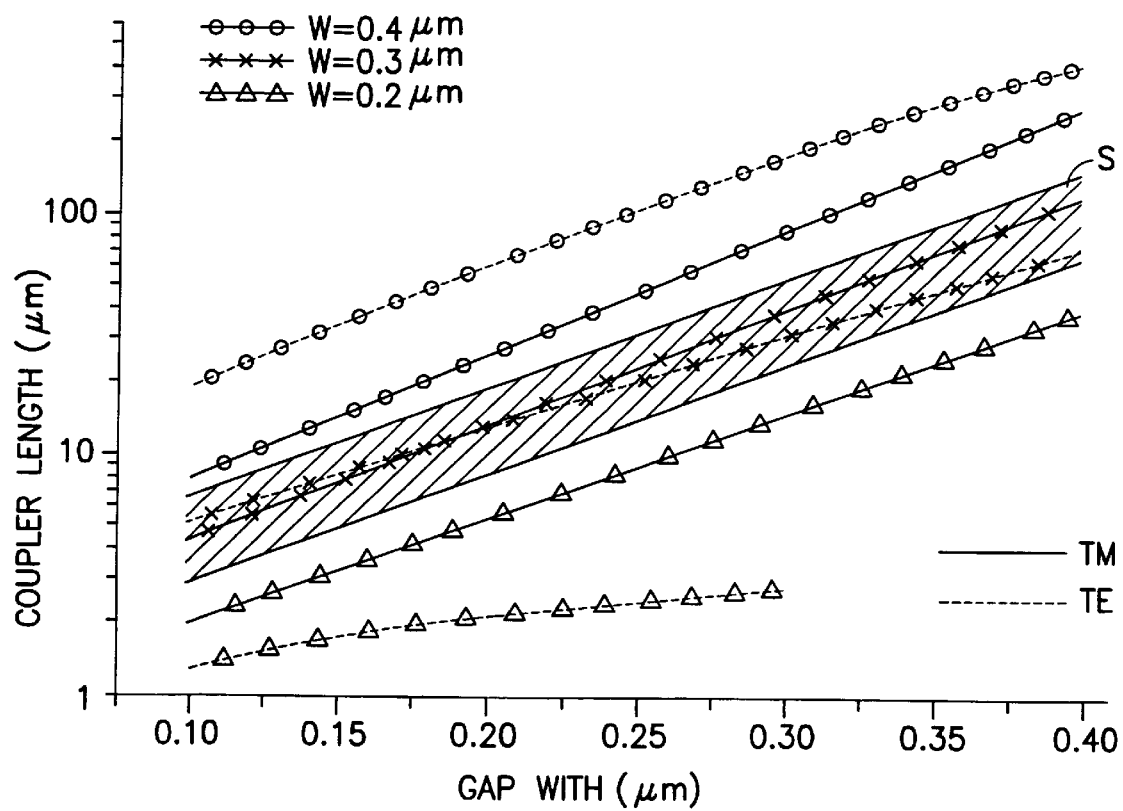
FIG. 5 is a graph depicting the relationship between coupler length and gap size at various waveguide widths for both TE and TM polarization modes.

The relationship between gap width g and coupler length L is depicted in FIG. 5, in which two families of curves representing both TE and TM values for different waveguide widths w are plotted as a function of gap width g (for a gap refractive index $n_g$ approximately equal to 1.0). A shaded band S represents the range of waveguide widths w of 0.25 μm to 0.35 μm. In this range of w, the coupler lengths are approximately the same for both TE and TM light polarized signals for all gap sizes. In particular, FIG. 5 shows that TE and TM curves for w=0.3 μm cross at a point where the gap size is approximately 0.2 μm. This means that polarization independence occurs where w=0.3 μm and g=0.2 μm.

RATIO OF INDICES OF REFRACTION

The ratio of the index of refraction inside the waveguide $n_{wg}$ to the index of refraction inside the gap $n_g$ is preferably greater than 1.5. Stated simply:

$$n_{wg}/n_g > 1.5 \tag{3}$$

The relatively large difference in the indices of refraction provides strong confinement of a light signal inside the respective waveguides 60, 90, and within the resonators 70, 80.

COUPLING FACTOR

The coupling factor is the indicator of the performance of an optical device. The parameters discussed herein have an impact on the coupling factor. When discussing coupling of an optical signal, the term "coupling factor" is used to indicate what percentage of the signal, assuming no losses, is coupled (i.e., transferred) between waveguides, for example. Thus, by varying one or more parameters, a desired coupling factor can be obtained. Specifically, coupling factor is calculated by finding a theoretical coupling length ($L_c$) for a specific design at which 100% of the light signal theoretically passes from one waveguide to the other, assuming no losses. The theoretical coupling length may be calculated as follows:

$$L_c = \frac{\lambda}{2(N_S - N_A)} \tag{4}$$

where, $N_S$ is an effective index of refraction for the symmetric mode of the coupled waveguides; and $N_A$ is an effective index of refraction for the asymmetric mode of the coupled waveguides.

To achieve a theoretical complete transfer in an optical device, the theoretical coupling length $L_c$ is solved for (using equation 4, for example), and the coupler lengths of first and second waveguides (from and to which the signal is coupled) are set equal to that calculated value.

The coupling factor ($F_c$) can be calculated as follows:

$$F_c = \sin^2[\pi L/(2L_c)] \tag{5}$$

where L is the actual coupler length for which the coupling factor is being calculated.

Thus, the coupling factor is a function of the actual coupler length L and the theoretical coupling length $L_C$. Theoretically, the coupling factor equals 1.0 where $L=L_C$-however, a coupling factor of 1.0 cannot be actually achieved because of losses. It should also be noted that the coupling factor can be less than one, both at lengths greater than and less than the theoretical coupling length.

The resonators of the present invention 70, 80 serve as a wavelength filter that separates out the desired wavelength (i.e., the on-resonance wavelengths) from the WDM optical signal. The resonance condition is satisfied when the round-trip length of the resonator is equal to an integer multiple of the optical wavelength in the waveguide medium.

The resonance wavelengths ($\lambda_o$) for the resonators 70, 80 may be determined by the following equation:

$$L_{rt} n_{eff} = m\lambda_o \tag{6}$$

where $L_{rt}$ is the round-trip length of the resonator 70, 80, $n_{eff}$ is the effective index of the resonator waveguide, and m is the order of resonance. Because $n_{eff}$ is different for TE and TM, it is necessary to use a different value of $L_{rt}$ or to use a different (m) in order to make $\lambda_o$ the same for both TE and TM. Those conditions may by represented by equation (7):

$$\frac{L_{TE} n_{TE}}{m_{TE}} = \frac{L_{TM} n_{TM}}{m_{TM}} \quad (7)$$

If the order of resonance m is fixed to be the same for both resonators, then the required difference in $L_{rt}$ is given by the following equation:

$$\frac{\Delta L_{rt}}{L_r} = \frac{\Delta n_{\textit{eff}}}{n_{\textit{eff}}} \quad (8)$$

where $\Delta n_{\textit{eff}} = n_{Tm} - n_{TE}$ is the difference in the effective indices for TE and TM. The small difference in $L_{rt}$ will give rise to only a small difference in the free spectral range.

The resonators 70, 80 preferably have substantially the same transfer characteristics for both TE and TM polarization modes. The shape of the filter response of the resonator is determined primarily by peak value and the linewidth, both of which depend on the coupling factor and the round trip loss. The power transmission signal T and reflection signal R (see, e.g., FIG. 2) are given by the following equations:

$$T = \frac{(1 - R_1)(1 - R_2)A}{\left(1 - \sqrt{R_1 R_2}\, A\right)^2 + 4\sqrt{R_1 R_2}\, A \sin^2\!\left(\frac{\delta}{2}\right)} \quad (9)$$

$$R = \frac{\left(\sqrt{R_1} - \sqrt{R_2}\, A\right)^2 + 4\sqrt{R_1 R_2}\, A \sin^2\!\left(\frac{\delta}{2}\right)}{\left(1 - \sqrt{R_1 R_2}\, A\right)^2 + 4\sqrt{R_1 R_2}\, A \sin^2\!\left(\frac{\delta}{2}\right)} \quad (10)$$

where $A = \exp(-\alpha L_{rt})$, and $\delta = (2\pi/\lambda) n_{\textit{eff}} L_{rt}$. $R_1$ and $R_2$, are the reflection coefficients at the waveguide resonator coupling points (i.e., along the coupling lengths), related to the coupling factors $F_{C1}$ and $F_{C2}$ by $R_i = 1 - F_{Ci}$ (i=1,2). It is desirable to make R=0 at resonance (i.e., when $\sin^2(\delta/2) = 0$). This requires that the following relationships be satisfied:

$$\sqrt{R_1} = \sqrt{R_2}\, A$$

or $$R_1 = R_2 A^2$$

or $$(1 - F_{C1}) = (1 - F_{C2}) A^2$$

or $$e^{-F_{C1}} = e^{-F_{C2}} e^{-2\alpha L_{rt}}$$

or $$F_{C1} \approx F_{C2} + 2\alpha L_{rt}$$

At resonance, the maximum transmission is given by the following equation:

$$T_{\max} = \frac{F_{C_2}}{F_{C_1}} e^{-\alpha L} \quad (11)$$

Thus, in order for the two resonators (i.e., the TE and TM filters) to have the same peak transmission (which is a requirement for a polarization independent filter), the loss and the two coupling factors ($F_{C1}$ and $F_{C2}$) must be equal for both TE and TM. the requirement for polarization insensitivity is that the loss and the two coupling coefficients be equal for TE and TM.

In operation, and with reference first to FIG. 2, the channel-dropping filter 150 of the present invention receives a multi-wavelength optical signal from an optical source 100 that is guided by input waveguide 60. That signal includes a wavelength to which the resonators 70, 80 are tuned, e.g., 1550 nm. That optical signal may also include both TE and TM polarization modes. As the signal propagates past the first resonator 70, part of the optical signal is evanescently coupled to the first resonator 70. The off-resonance wavelengths destructively interfere within the resonator 70 and thus eventually attenuate. Only the on-resonance wavelength constructively interferes and couples out of the resonator 70 into the output waveguide 90. In addition, only one of the modes of the optical signal is coupled from the input waveguide 60 to the resonator 70 and to the output waveguide 90, depending upon the width of the input waveguide 70 and resonator waveguide. Similarly, part of the optical signal is coupled to the second resonator 80, where the on-resonance wavelength and the other mode couple to the output waveguide 90, where they recombine with the signal coupled from the first resonator 70 and are output from the filter 150. Thus, both polarization modes of an optical signal having a predetermined wavelength may be coupled from the WDM optical signal and redirected or re-routed to a desired destination.

Figure 3:
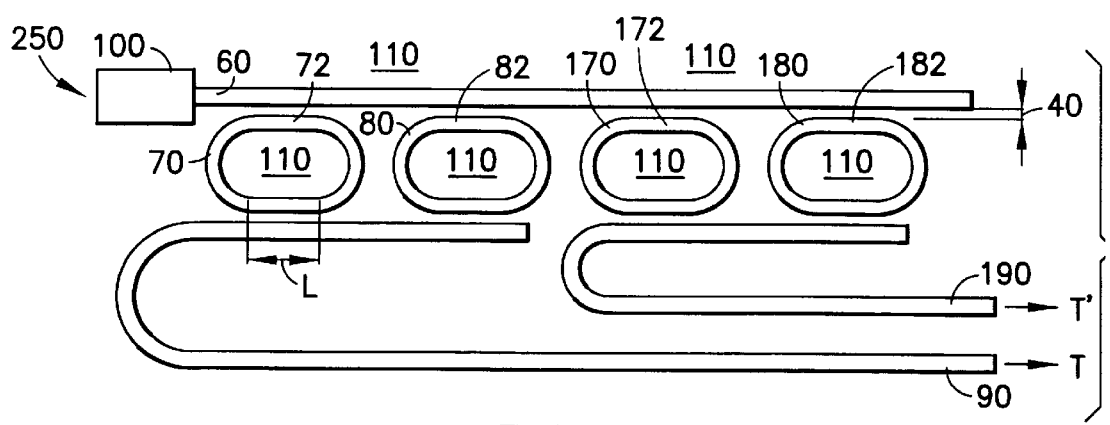
FIG. 3 is a schematic view of a multi-stage polarization independent channel-dropping filter constructed in accordance with the present invention.

A plurality of tuned resonators may be used to construct a 1×N channel-dropping filter 250 as depicted in FIG. 3. The resonators 70, 80 and 170, 180 are provided in pairs, each pair being tuned to a particular wavelength and including one resonator tuned to TE mode polarization and the other tuned to TM mode polarization. A plurality (i.e., N) of output waveguides 90, 190 are provided to output a plurality of optical signals, each having a different wavelength. Operation of the waveguides and resonators of the filter 250 of FIG. 3 are essentially the same as described above with respect to FIG. 2.

The resonators of the present invention may be tuned to a predetermined wavelength by virtue of their design and construction. Alternatively, they may be selectively tunable due to the presence of an electrical field or signal and due to the electro-optic effect.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A polarization independent optical filter for receiving from an optical source a polarized wavelength-division multiplexed (WDM) optical signal having a plurality of wavelengths and defining random first and second polarizations, said filter comprising:

an input waveguide having a first width and a second width and for receiving the polarized WDM optical signal;

an output waveguide for outputting from said filter a polarized optical signal having a predetermined wavelength that is one of the plurality of wavelengths of the WDM optical signal and having the first and second polarizations;

a first resonator, tuned to said predetermined wavelength and one of the first and second polarizations and optically coupled to said input waveguide and separated therefrom by a gap for optically coupling from said input waveguide a part of the optical signal having one of the predetermined wavelengths and one of the first and second polarizations;

a second resonator, tuned to said predetermined wavelength and the other one of the first and second polarizations and optically coupled to said input waveguide, and separated therefrom by said gap, for optically coupling from said input waveguide another part of the optical signal having the predetermined wavelength and the other one of the first and second polarizations;

said first and said second resonators respectively coupling said part and said another part of the optical signal at said predetermined wavelength to said output waveguide which outputs from said filter an optical signal at said predetermined wavelength and having the first and second polarizations.

2. A polarization independent optical filter as recited by claim 1, wherein the first polarization is transverse magnetic and wherein the second polarization is transverse electric.

3. A polarization independent optical filter as recited by claim 2, wherein said first filtering element comprises a first filtering waveguide having a width greater than 0.35 $\mu$m and is tuned to the first polarization, and wherein said input waveguide first width is greater than 0.35 $\mu$m and located proximate said first filtering waveguide, and wherein said second filtering element comprises a second filtering waveguide having a width less than 0.25 $\mu$m and is tuned to the second polarization, and wherein said input waveguide second width is less than 0.25 $\mu$m and is located proximate said second filtering element.

4. A polarization independent optical filter as recited by claim 1, wherein said gap is less than approximately 0.5 $\mu$m.

5. A polarization independent optical filter as recited by claim 4, wherein said input and said output waveguides and said first and said second filtering elements have respective widths of less than approximately 1.0 $\mu$m.

6. A polarization independent optical filter as recited by claim 5, wherein the first polarization is transverse magnetic and wherein the second polarization is transverse electric, and wherein said first filtering element comprises a first filtering waveguide having a width greater than 0.35 $\mu$m and is tuned to the first polarization, and wherein said input waveguide first width is greater than 0.35 $\mu$m and located proximate said first filtering waveguide, and wherein said second filtering element comprises a second filtering waveguide having a width less than 0.25 $\mu$m and is tuned to the second polarization, and wherein said input waveguide second width is less than 0.25 $\mu$m and is located proximate said second filtering element.

7. A polarization independent optical filter as recited by claim 1, wherein said first and second filtering elements each comprise a micro-ring resonator.

8. A polarization independent optical filter as recited by claim 1, wherein each of said first and second filtering elements includes a substantially straight coupling section defining respective coupler lengths between said first and second filtering elements and said input and output waveguides.

9. A polarization independent optical filter as recited by claim 8, wherein each of said first and second filtering elements has substantially the same coupler length of less than approximately 50 $\mu$m.

10. A polarization independent optical filter as recited by claim 1, wherein said first and second filtering elements have the same transfer characteristics for TE and TM polarization modes.

11. A multi-stage polarization independent optical filter for receiving from an optical source a randomly polarized wavelength-division multiplexed (WDM) optical signal having a plurality of wavelengths and defining first and second polarizations, said filter comprising:

an input waveguide having a first width and a second width and for receiving the polarized WDM optical signal;

a plurality of filtering elements each comprising:

an output waveguide for separately outputting from said filter a polarized optical signal having a first predetermined wavelength that is one of the plurality of wavelengths of the WDM optical signal and having the first and second polarizations;

a first resonator, tuned to said first predetermined wavelength and one of the first and second polarizations and optically coupled to said input waveguide, and separated therefrom by a gap, for optically coupling from said input waveguide a part of the optical signal having the predetermined wavelength and one of the first and second polarizations; and a second resonator, tuned to said first predetermined wavelength and the other one of the first and second polarizations and optically coupled to said input waveguide, and separated therefrom by said gap, for optically coupling from said input waveguide another part of the optical signal having the predetermined wavelength and the other one of the first and second polarizations;

said first and said second resonators respectively coupling said part and said another part of the optical signal at said first predetermined wavelength to said output waveguide which outputs from said filter an optical signal at said first predetermined wavelength and having the first and second polarizations.

12. A polarization independent optical filter as recited by claim 11, wherein the first polarization if transverse magnetic and wherein the second polarization is transverse electric.

13. A polarization independent optical filter as recited by claim 12, wherein each said first resonator comprises a first resonator waveguide having a width greater than 0.35 $\mu$m and is tuned to the first polarization, and wherein said input waveguide first width is greater than 0.35 $\mu$m and located proximate each said first resonator and wherein each said second resonator comprises a second resonator waveguide having a width less than 0.25 $\mu$m and is tuned to the second polarization, and wherein said input waveguide second width is less than 0.25 $\mu$m and is located proximate each said second resonator.

14. A polarization independent optical filter as recited by claim 11, wherein said gap is less than approximately 0.5 µm.

15. A polarization independent optical filter as recited by claim 14, wherein each of said input and said output waveguides and each of said first and said second resonators have respective widths of less than approximately 1.0 µm.

16. A polarization independent optical filter as recited by claim 15, wherein the first polarization if transverse magnetic and wherein the second polarization is transverse electric, and wherein each said first resonator comprises a first resonator waveguide having a width greater than 0.35 µm and is tuned to the first polarization, and wherein said input waveguide first width is greater than 0.35 µm and located proximate each said first resonator, and wherein each said second resonator comprises a second resonator waveguide having a width less than 0.25 µm and is tuned to the second polarization, and wherein said input waveguide second width is less than 0.25 µm and is located proximate each said second resonator.

17. A polarization independent optical filter as recited by claim 11, wherein each of said first and second resonators each comprise a micro-ring resonator.

18. A polarization independent optical filter as recited by claim 17, wherein each of said first and second resonators includes a substantially straight coupling section defining respective coupler lengths between each of said first and second resonators and each of said respective input and output waveguides.

19. A polarization independent optical filter as recited by claim 18, wherein each of said first and second resonators has substantially the same coupler length of less than approximately 50 µm.

20. A polarization independent optical filter as recited by claim 11, wherein said first and second resonators have the same transfer characteristics for TE and TM polarization modes.

* * * * *